US009759576B2

(12) United States Patent  
Kaplan et al.

(10) Patent No.: US 9,759,576 B2  
(45) Date of Patent: Sep. 12, 2017

(54) ROAD SINUOSITY TO ENHANCE SPEED APPROXIMATION IN ROAD NAVIGATION

(71) Applicant: International Business Machines Corporation, Armonk, NY (US)

(72) Inventors: Philippe Kaplan, Le Rouret (FR); Georges-Henri Moll, Villeneuve-Loubet (FR); Xavier Nodet, Antibes (FR); Olivier Oudot, Vallauris (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/967,808

(22) Filed: Dec. 14, 2015

(65) Prior Publication Data

US 2017/0167889 A1 Jun. 15, 2017

(51) Int. Cl.  
*G01C 21/36* (2006.01)  
*G01S 19/39* (2010.01)

(52) U.S. Cl.  
CPC ..... *G01C 21/3697* (2013.01); *G01C 21/3676* (2013.01); *G01S 19/39* (2013.01)

(58) Field of Classification Search  
CPC .................................................. G01C 21/3697  
See application file for complete search history.

(56) References Cited

U.S. PATENT DOCUMENTS

| 8,224,562 B2 * | 7/2012 | Katzer ............... G01C 21/3461 340/995.19 |
| 8,285,485 B2 | 10/2012 | Montealegre et al. |
| 9,068,853 B2 * | 6/2015 | Strassenburg-Kleciak G01C 21/3461 |
| 2007/0168119 A1 | 7/2007 | Mori |
| 2008/0004797 A1 | 1/2008 | Katzer |
| 2009/0222198 A1 | 9/2009 | Raynaud |
| 2015/0012210 A1 | 1/2015 | Griffiths |

FOREIGN PATENT DOCUMENTS

WO 2006042689 A1 4/2006

OTHER PUBLICATIONS

Desmond O'Connor, "A Network Scan of Horizontal Road Geometry", [online], retrieved on Jun. 10, 2015, Retrieved from the Internet <URL:http://www.itrn.ie/uploads/sesB2_ID124.pdf>, all pages.

(Continued)

*Primary Examiner* — Angela Ortiz  
*Assistant Examiner* — Michael Berns  
(74) *Attorney, Agent, or Firm* — Law Offices of Ira D. Blecker, P.C.

(57) ABSTRACT

A navigation system which includes a central processing unit; a nonvolatile storage for storing digitized map data; a road sinuosity S(R) of a route including a plurality of digitized road segments calculated from a starting point to a destination point to be traveled by a user by summing the rotation angle of each of the road segments divided by the distance of each of the road segments; a module to determine an estimated travel time of the route; a module to determine a corrected travel time using the road sinuosity S(R); and a display to display the corrected travel time.

16 Claims, 4 Drawing Sheets

(56) References Cited

OTHER PUBLICATIONS

Cara Lauder et al., "Developing and validating a road travel time network for cost path analysis", Presented at SIRC 2001—The 13th Annual Colloquium of the Spatial Information Research Centre University of Otago, Dunedin, New Zealand, Dec. 2-5, 2001, all pages.

Mihai Bulai et al., "Creating, Testing and Applying a GIS Road Travel Cost for Romania", Geographia Technica, No. 1, 2012, pp. 8 to 18.

"Curvature—Wikipedia, the free encyclopedia", [online], retrieved on Jun. 18, 2015, Retrieved from the Internet <URL:https://en.wikipedia.org/wiki/Curvature>, all pages.

"Element—Wikipedia, the free encyclopedia", [online], retrieved on Jun. 18, 2015, Retrieved from the Internet <URL:https://en.wikipedia.org/wiki/Elements>, all pages.

"Sinuosity—Wikipedia, the free encyclopedia", [online], retrieved on Jun. 18, 2015, Retrieved from the Internet <URL:https://en.wikipedia.org/wiki/Sinuosity>, all pages.

* cited by examiner

FIG. 1A
(PRIOR ART)

SINUOSITY= 7.42/1.05 = 7.07

ROAD SINUOSITY TO ENHANCE SPEED APPROXIMATION IN ROAD NAVIGATION

BACKGROUND

The present exemplary embodiments pertain to geolocation navigation which may help a traveler travel from point to point. More particularly, the present exemplary embodiments pertain to geolocation navigation using a new road sinuosity to more accurately predict the time for traveling from point to point.

Geolocation-based navigation systems for car drivers, such as road global positioning system (GPS) units, help in navigation by determining an "optimal" route for traveling between two points. The criteria for optimal is by default "fastest".

The computation of the best route may be done by estimating the car speed on each road segment on the optimal route. The car speed may be estimated based on map data that describe the type of road (for example, highway, state road, local road), city versus country landscape and known speed limits on the different road segments. Other metadata and statistics may come from analytics of real paths primarily used by GPS manufacturers.

Road sinuosity is an indicator of the curviness of the road. Road sinuosity is a key attribute of navigation but may be partially ignored or, if considered, road sinuosity may be included as an attribute that is estimated arbitrarily or poorly for each road segment.

BRIEF SUMMARY

The various advantages and purposes of the exemplary embodiments as described above and hereafter are achieved by providing, according to a first aspect of the exemplary embodiments, a method for the determination of a time to travel a route using a navigation system comprising:
determining a road sinuosity of the route from a starting point to a destination point based on digitized map data comprising:
  providing a digitized route from the digitized map data which comprises data coordinates at a plurality of discrete data points along the route;
  determining a distance between each data point from the data coordinates of each data point to result in a plurality of distances;
  summing the distances between all of the data points:
  determining the value of rotation angles between route segments;
  calculating the road sinuosity S(R) by summing the absolute value of all of the rotation angles and dividing by the sum of the distances between all of the data points;
determining a time multiplier by a tabulated function in which the time multiplier is determined for various road sinuosities;
obtaining an estimated travel time of the route from the navigation system; and
calculating a corrected travel time by multiplying the estimated travel time by the time multiplier to result in a corrected travel time,
wherein the method is performed on one or more computing devices.

According to a second aspect of the exemplary embodiments, there is provided a computer program product for the determination of a time to travel a route using a navigation system, the computer program product comprising a computer readable storage medium having program instructions embodied therewith, the program instructions executable by a computing device to cause the computing device to perform a method comprising:
determining a road sinuosity of the route from a starting point to a destination point based on digitized map data comprising:
  providing a digitized route from the digitized map data which comprises data coordinates at a plurality of discrete data points along the route;
  determining a distance between each data point from the data coordinates of each data point to result in a plurality of distances;
  summing the distances between all of the data points:
  determining the value of rotation angles between route segments;
  calculating the road sinuosity S(R) by summing the absolute value of all of the rotation angles and dividing by the sum of the distances between all of the data points;
determining a time multiplier by a tabulated function in which the time multiplier is determined for various road sinuosities;
obtaining an estimated travel time of the route from the navigation system; and
calculating a corrected travel time by multiplying the estimated travel time by the time multiplier to result in a corrected travel time.

According to a third aspect of the exemplary embodiments, there is provided a navigation system comprising:
a central processing unit;
a nonvolatile storage for storing digitized map data;
road sinuosity of a route traveled by a user calculated from a starting point to a destination point comprising:
  a digitized route for the route to be traveled by the user obtained from the stored digitized map data, the digitized route comprising data coordinates at a plurality of discrete data points along the route;
  a distance between each data point determined from the data coordinates of each data point to result in a plurality of distances;
  the distances between all of the data points summed:
  a value of rotation angles between route segments;
  road sinuosity S(R) calculated by summing the absolute value of all of the rotation angles and dividing by the sum of the distances between all of the data points
the central processing unit programmed to determine an estimated travel time of the route;
the central processing unit programmed to determine a corrected travel time using the road sinuosity S(R); and
a display to display the corrected travel time.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

It is well known to calculate the sinuosity of a road and to use that sinuosity to estimate the travel speeds along that road for the purpose of improving a GPS navigation system when it suggests the best route that a driver should take.

A conventional definition of road sinuosity (hereafter just "sinuosity") for measuring the curviness of the road is the actual path length divided by the shortest path length. For a straight line, the sinuosity is 1. Two more complicated examples of sinuosity are shown in FIGS. 1A and 1B.

Figure 1A:
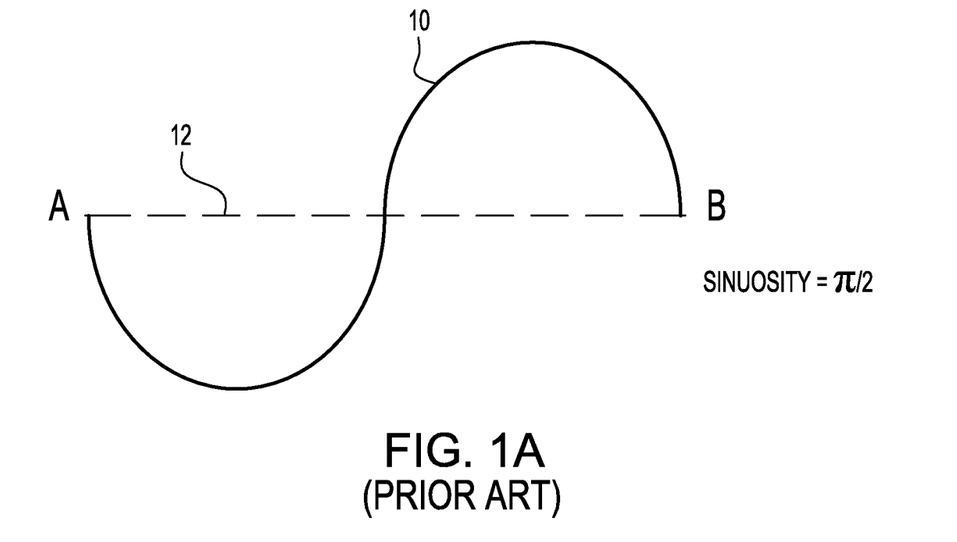
FIG. 1A is a first example of a prior art method of calculating road sinuosity and FIG. 1B is a second example of a prior art method of calculating road sinuosity.

Referring now to FIG. 1A, there is shown a winding road 10 which extends between point A and point B. In this example in FIG. 1A, the winding road 10 essentially consists of two half-circles. Therefore, the total length of the road is the circumference of the circle πD. The shortest path length from point A to point B is through line 12 which is equal to twice the length of the diameter of the circle. Sinuosity of road 10 then is πD (actual path length) divided by 2D (shortest path length) or π/2 as shown in FIG. 1A.

Figure 1B:
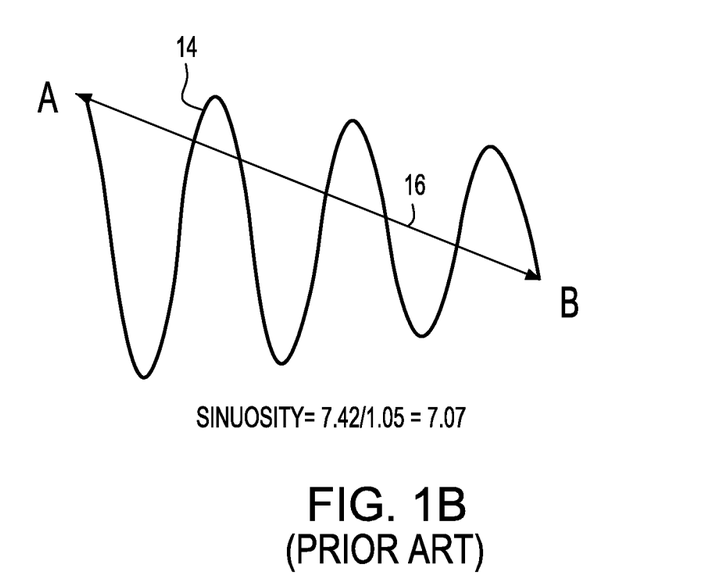

FIG. 1B shows a winding road 14 having switchbacks like a mountain road might have. The road extends between point A and point B along line 16. In this example, the road 14 has an actual path length of 7.42 and the shortest path along line 16 has a length of 1.05. Then, the sinuosity of road 14 is 7.42 divided by 1.05 or 7.07.

There is a technical problem with using conventional sinuosity and other similar measures of the curviness of the road. Sinuosity does not distinguish between a big turn and several little turns. Knowing the difference between a big turn and several little turns would make a big difference to a driver when choosing a route as the number of turns may have an effect on the speed that the driver may travel.

The present exemplary embodiments address the problems of the prior art by computing a different sinuosity that corresponds to real rotational angle per distance covered. The inventive sinuosity is the sum of the absolute value of rotation angles divided by the sum of the distances of the actual road to be traveled. The inventive sinuosity is accurate and simple to compute.

The technical advantages of the inventive sinuosity over the prior art include:
It differentiates easily a single big turn from several smaller turns.
It is only based on data already stored inside all road GPS navigation systems.
It does not depend on the accuracy of the road description.
It does not require statistical analysis of actual car travels.

Some definitions may be useful in the description of the exemplary embodiments.

A node represents a specific point on the earth's surface defined by its latitude and longitude. Each node comprises at least an id number and a pair of coordinates.

A way is an ordered list of at least two nodes that define a polyline. Ways are used to represent linear features such as rivers and roads. Ways may also be referred to as segments. If there are more than two nodes, then the way between each pair of nodes may be called a subsegment.

Figure 2:
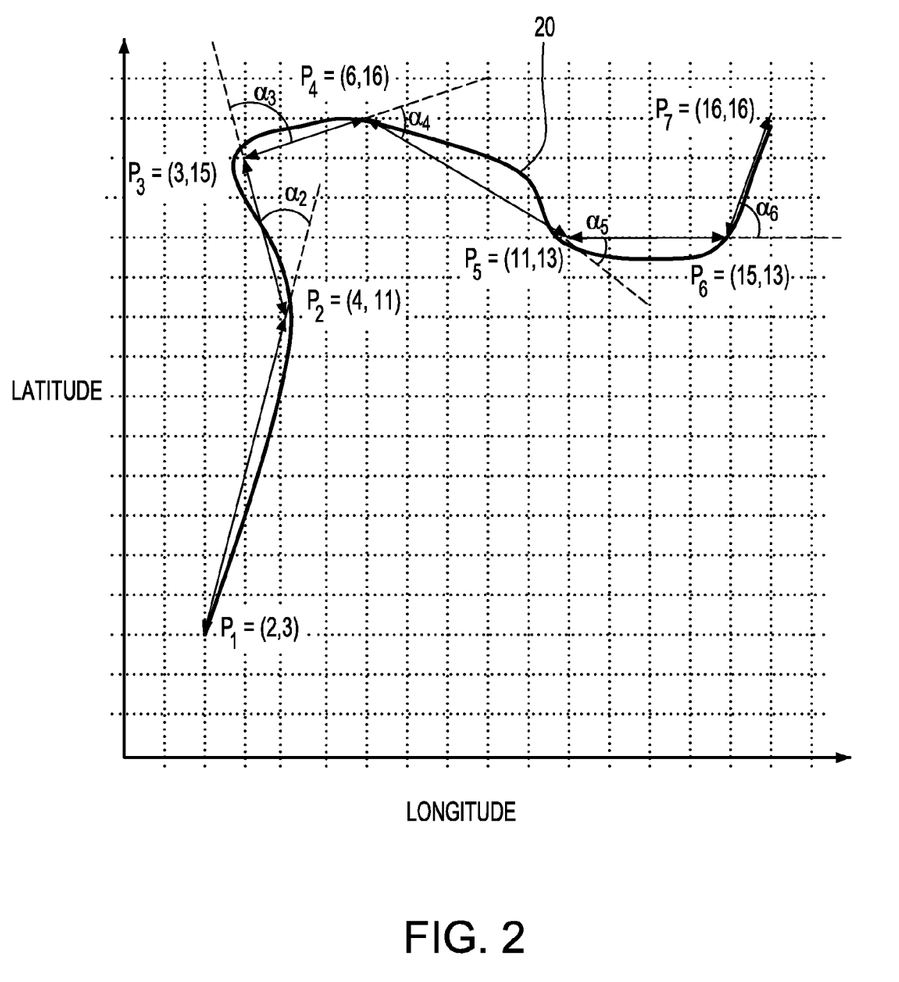
FIG. 2 is a graph of an exemplary road that is digitized with data points having latitude and longitude coordinates.

Referring to FIG. 2, there is illustrated an exemplary road 20 shown on a graph of latitude and longitude being defined by a series of nodes P1 to P6. Each one of the nodes P1 to P6 has a pair of coordinates.

In the real world, mapmakers including but not limited to TOMTOM®, GARMIN®, GOOGLE® and OPENMAP™ have digitized most rivers and roads so that the rivers and roads each comprise a series of points or nodes having latitude and longitude coordinates. Thus, in the exemplary road 20 shown in FIG. 2, the nodes P1 to P6 may have been obtained from the mapmakers for the exemplary road 20 such that the coordinates of nodes P1 to P6 may be the latitude (vertical axis) and longitude (horizontal axis) of the exemplary road 20. For the purpose of illustration and not limitation, the coordinates P1 to P6 shown in the graph of FIG. 2 are simply the graph coordinates of the points P1 to P6 shown in FIG. 2.

The exemplary road 20 may be referred to as a route segment R composed by a list of nodes R={Pi=(xi, yi)}, with i in [1 ... n]. In FIG. 2, the route segment R is composed of the nodes: {(2, 3), (4, 11), (3, 15), (6, 16), (11, 13), (15, 13), (16, 16)}. The distance between each node is a subsegment and may be computed as:

$$\text{dist}(P_i, P_j) = \sqrt{(x_j - x_i)^2 + (y_j - y_i)^2}$$

with the total length of the route segment R being the sum of all of the distances of the subsegments between the nodes as follows:

$$\text{Total length} = \sum_{i=1}^{n-1} \text{dist}(P_i, P_{i+1})$$

Next, the angle between each subsegment may be defined as:

angle($P_i$)=angle $\alpha_i$ at point $P_i$ (between segments ($P_{i-1}, P_i$), and ($P_i, P_{i+1}$))

As shown in FIG. 2, the angles are $\alpha_2$ to $\alpha_6$. The angle $\alpha_2$ for example is defined as the absolute angle between subsegment 1 between P1 and P2 and subsegment 2 between P2 and P3. Mathematically, the angle (Pi) may be defined as:

$$\text{angle}(P_i) = \pi - \cos^{-1}\left(\frac{\text{dist}(P_{i-1}, P_i)^2 + \text{dist}(P_i, P_{i+1})^2 - \text{dist}(P_{i-1}, P_{i+1})^2}{2 \times \text{dist}(P_{i-1}, P_i) \times \text{dist}(P_i, P_{i+1})}\right)$$

Finally, the road sinuosity according to the exemplary embodiments is:

$$S(R) = \frac{\sum_{i=2}^{n-1} |\text{angle}(P_i)|}{\sum_{i=1}^{n-1} \text{dist}(P_i, P_{i+1})}$$

In other words, the road sinuosity for road segment R is the sum of the absolute value of rotation angles divided by the sum of the distances of the actual road to be traveled. The units for the road sinuosity may be radians/meter or radians per other measure of distance traveled. Contrary to the conventional definition of sinuosity described earlier, the road sinuosity of the exemplary embodiments increases if the distance decreases which corresponds to a road with little turns (i.e., more angles) compared to big turns.

The road sinuosity may be applied as a time multiplier to weight the existing travel time estimation function. The existing travel time estimation function is typically built into GPS navigation systems and depends on the type of road (e.g., city road, country road, motorway) and an average speed that is entered into the GPS navigation system for each type of road. The existing travel time function may also be calculated, although not as accurately, by the user by dividing the estimated distance to be traveled by the estimated speed over the distance traveled. Such a travel time estimation function may not take into account the sinuosity of the road. That is, a curvy, mountain road with lots of switchbacks has a much different sinuosity than a straight or slightly curvy flat road. To the extent that the GPS navigation system uses sinuosity in its travel time estimation function, it is the conventional sinuosity which, as has been explained above, does not accurately take into account the curviness of the road. That is, conventional sinuosity does not accurately differentiate between roads with one big curve or many little curves.

The computation of the time multiplier (TM) from the road sinuosity (S(R)) may be done using a tabulated function determined by statistical experimentation or by actual measurements.

A tabulated function may be defined as a function whose values are known and tabulated for a finite number of points on a grid, rather than set by an analytical expression.

For the present tabulated function, it is assumed that if the sinuosity is zero (representing a straight road), then the time multiplier is one. If the sinuosity tends to infinite, the speed multiplier is zero representing an infinite reduction in speed. Points in between may be estimated or may be more accurately determined by real driver data.

As an example, assume that the posted speed on a road is 90 km/h. One data point may be estimated that for a complete turn in 100 meters representing a tight curve, the sinuosity is 0.0628 and it is estimated that the maximum speed that this road segment may be driven is 30 km/h as compared to the posted speed of 90 km/h. Then, for a sinuosity of 0.0628, the time multiplier may be 30/90 or 0.333.

For another data point, it may be estimated that for a complete turn in 1 kilometer representing a wide curve, the sinuosity is 0.00628 and it is estimated that the maximum speed that this road segment may be driven is 80 km/h as compared to the posted speed of 90 km/h. Then, for a sinuosity of 0.00628, the time multiplier may be 80/90 or 0.89.

The tabulated function, as an example, may look like this:

| SINUOSITY | TIME MULTIPLIER |
| --- | --- |
| 0 | 1 |
| ... | ... |
| 0.00628 | .89 |
| ... | ... |
| 0.0628 | .333 |
| ... | ... |
| INFINITY | 0 |

The corrected travel time is then the estimated travel time times the time multiplier. The corrected travel time would be more accurate than the estimated travel time since a truer measure of the road sinuosity has been used in the calculation of the travel time.

Figure 3:
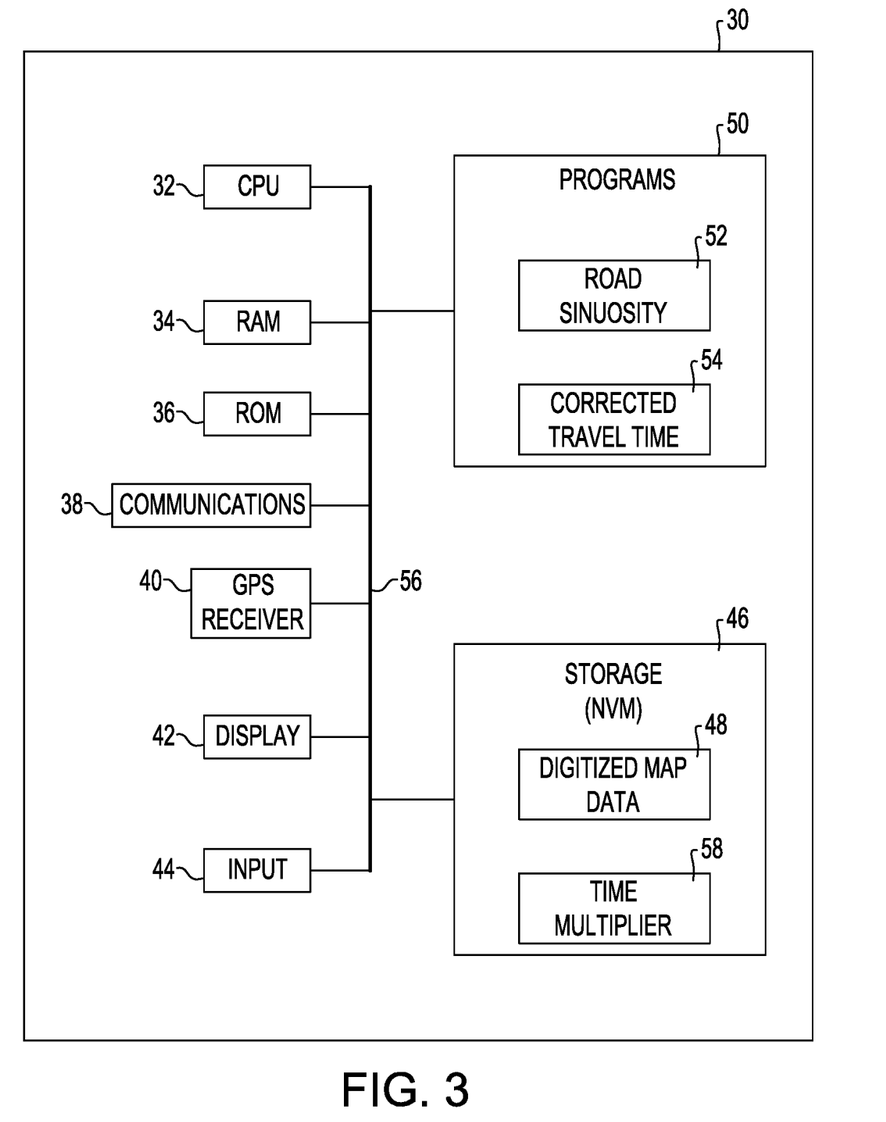
FIG. 3 is a navigation system having road sinuosity determined according to the exemplary embodiments.

The road sinuosity according to the exemplary embodiments may be used in a GPS navigation system to provide a more accurate estimate of the time to travel from an origin to a destination. FIG. 3 illustrates an exemplary embodiment of a navigation system 30.

The navigation system 30 may include at least one central processing unit (CPU) 32, RAM memory 34 and ROM memory 36. For uploading and downloading information, the navigation system 30 may have communications capability 38 such as cellular, Wi-Fi or satellite. Current navigation systems may have GPS capability for locating the navigation system with latitude and longitude coordinates. Navigation system 30 thus may also have a GPS receiver 40 for performing GPS functions.

For displaying information, the navigation system 30 may have a display 42 (which may be a touch screen) as well as input means 44 such as a mouse, keyboard or USB port to input information into the navigation system 30.

The navigation system 30 may have storage 46 such as a disk drive or other nonvolatile storage such as a solid state drive to store the navigation system operating system and certain programs. Included within the navigation system 30 may be the typical navigation program of choosing the path a traveling user may take between an origin and a destination once the user has input the desired destination and the navigation system 30 has located the GPS coordinates of the user's origin. Also located in the storage 46 may be digitized map data 48 which digitizes the roads and rivers (and other features as well) for the area covered by the navigation system 30. The digitized map data 48 may be used in the exemplary embodiments to provide a more accurate prediction of the speed that a traveling user is expected to have.

Further, the navigation system 50 may have additional programs 50, which may be resident in the storage 46 or CPU 32 or elsewhere in the navigation system 30. The additional programs 50 are shown apart from the storage 46 as an example embodiment. The additional programs 50 may include a road sinuosity program 52 for calculating the road sinuosity according to the exemplary embodiments and a corrected travel time program 54 for calculating a corrected travel time according to the exemplary embodiments. The road sinuosity program 52 and the corrected travel time program 54 may be used in conjunction with the navigation system's conventional path program to provide a more accurate time for traveling along the path to the destination.

In addition, the navigation system 30 through communications capability 38 may download the digitized map data 48, if not already in storage 46, from the navigation system manufacturer or other source. The digitized map data 48 also may be updated from time to time from the navigation system manufacturer or other source. Moreover, the road sinuosity program 52 or corrected travel time program 54 in cooperation with the communication capability may communicate with the navigation system manufacturer or other source to download the digitized map data 48.

The various components of the navigation system 50 may be interconnected by bus 56.

Together with the navigating program inherent in navigation system 50, the navigation system 50 provides improved estimating of the time to travel a given road and thus improves the accuracy of the navigation system 50.

Figure 4:
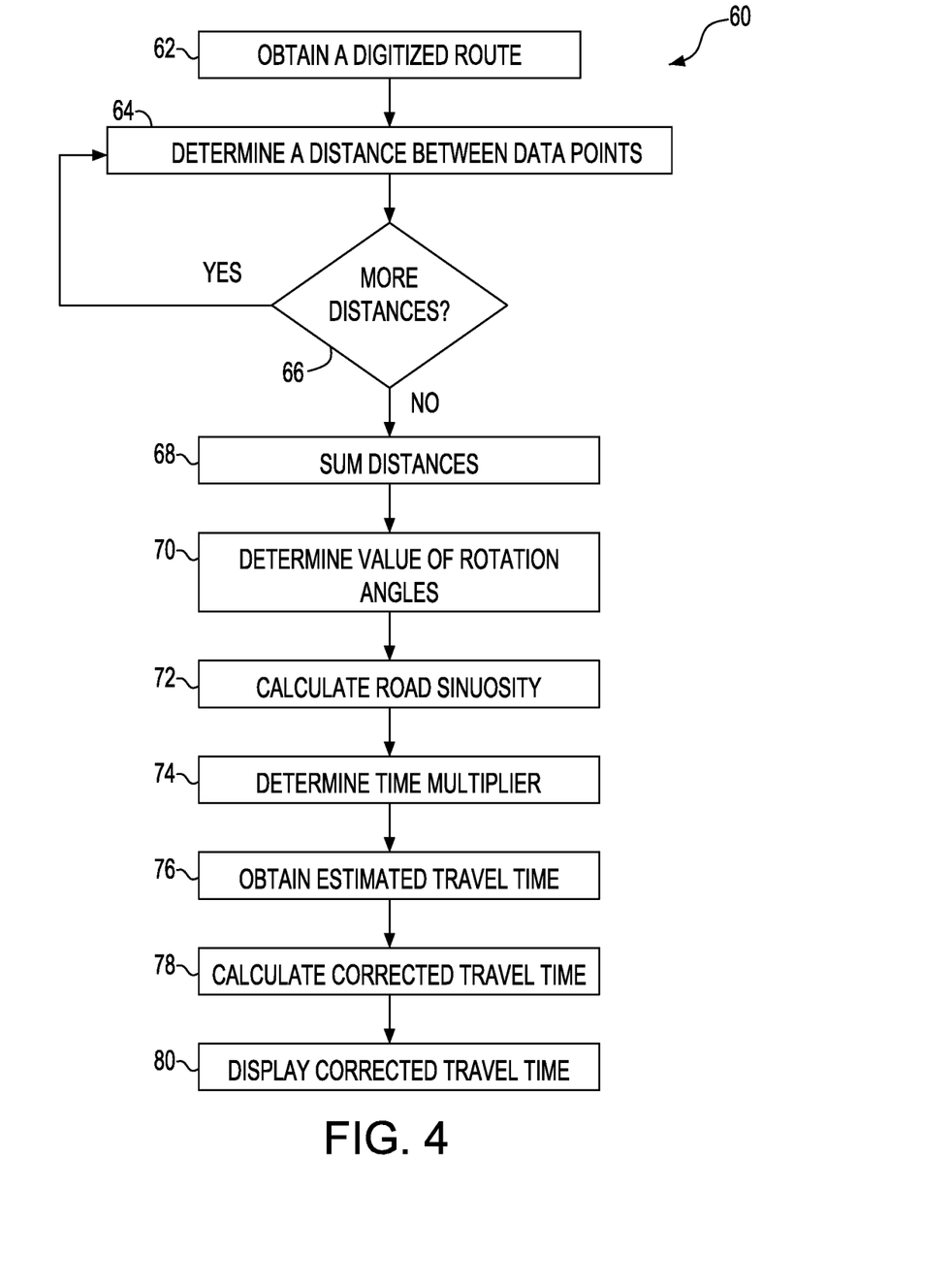
FIG. 4 is a method of determining a corrected travel time using road sinuosity according to the exemplary embodiments.

Referring now to FIG. 4, there is illustrated a method 60 according to the exemplary embodiments for determining a time to travel a route. Initially, with respect to the route to be traveled, a digitized route is obtained, box 62. Typically, such a digitized route may be obtained from a mapmaker (as mentioned earlier) and is usually contained in commercial navigation devices such as in storage 46 of navigation system 30. The digitized route contains data coordinates at a plurality of discrete data points (i.e., nodes) along the route.

Next, a distance may be determined between each of the data points along the route, box 64. The distance may be determined according to the following equation in which "x" and "y" are the coordinates for each of the data points along the route.

$$\text{dist}(P_i, P_j) = \sqrt{(x_j - x_i)^2 + (y_j - y_i)^2}$$

The process continues determining the distance between each set of data points. At decision box 66, if additional distances are required to be determined between other data points, the process returns to determine those additional distances, box 64. If there are no more distances to determine, the process proceeds to sum all of the distances just determined, box 68, according to the following calculation:

$$\text{Total length} = \sum_{i=1}^{n-1} \text{dist}(P_i, P_{i+1})$$

Thereafter, the value of the rotation angle between each road subsegment and the next road subsegment are determined, box 70. The rotation angle may be defined as:

angle($P_i$) = angle $\alpha_i$ at point $P_i$ (between segments ($P_{i-1}, P_i$), and ($P_i, P_{i+1}$))

And, the rotation angle may be calculated according to the following equation:

$$\text{angle}(P_i) = \pi - \cos^{-1}\left(\frac{\text{dist}(P_{i-1}, P_i)^2 + \text{dist}(P_i, P_{i+1})^2 - \text{dist}(P_{i-1}, P_{i+1})^2}{2 \times \text{dist}(P_{i-1}, P_i) \times \text{dist}(P_i, P_{i+1})}\right)$$

The road sinuosity of the route, S(R), may then be calculated, box 72, by summing the absolute value of all of the rotation angles for the route divided by the sum of the distances between each pair of data points according to the following equation:

$$S(R) = \frac{\sum_{i=2}^{n-1} |\text{angle}(P_i)|}{\sum_{i=1}^{n-1} \text{dist}(P_i, P_{i+1})}$$

A time multiplier is determined (as explained above), box 74, and may be stored 58 in storage 46 of navigation system 30 and an estimated travel time is obtained from the navigation system 30 (as explained above), box 76.

Thereafter, a corrected travel time may be calculated by multiplying the estimated travel time by the time multiplier to result in a corrected travel time, box 78. The corrected travel time may then be displayed on the navigation system 30, box 80.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method for the determination of a time to travel a route using a navigation system comprising:
   determining, at a navigation system comprising a central processing unit, a global positioning system receiver and a display, a road sinuosity of the route from a starting point provided by the global positioning system receiver to a destination point based on digitized map data comprising:
   providing a digitized route from the digitized map data which comprises data coordinates at a plurality of discrete data points along the route;
   determining a distance between each data point from the data coordinates of each data point to result in a plurality of distances;
   summing the distances between all of the data points:
   determining the value of rotation angles between route segments;
   calculating the road sinuosity S(R) by summing the absolute value of all of the rotation angles and dividing by the sum of the distances between all of the data points;
   determining by the central processing unit a time multiplier by a tabulated function in which the time multiplier is determined for various road sinuosities;
   obtaining by the central processing unit an estimated travel time of the route from the navigation system; and
   calculating by the central processing unit a corrected travel time by multiplying the estimated travel time by the time multiplier to result in a corrected travel time, and
   displaying on the display the corrected travel time to a viewer of the display.

2. The method of claim 1 wherein determining the value of the rotation angles is according to the following equation:

$$\text{angle}(P_i) = \pi - \cos^{-1}\left(\frac{\text{dist}(P_{i-1}, P_i)^2 + \text{dist}(P_i, P_{i+1})^2 - \text{dist}(P_{i-1}, P_{i+1})^2}{2 \times \text{dist}(P_{i-1}, P_i) \times \text{dist}(P_i, P_{i+1})}\right)$$

where
angle $(P_i)$=angle $\alpha_i$ at point $P_i$ (between segments $P_{i-1}$, $P_i$), and ($P_i$, $P_{i+1}$)).

3. The method of claim 2 wherein calculating the road sinuosity S(R) is according to the following equation:

$$S(R) = \frac{\sum_{i=2}^{n-1} |\text{angle}(P_i)|}{\sum_{i=1}^{n-1} \text{dist}(P_i, P_{i+1})}.$$

4. The method of claim 1 further comprising downloading the digitized map data from a source having the digitized map data.

5. A computer program product for the determination of a time to travel a route using a navigation system, the computer program product comprising a non-transitory computer readable storage medium having program instructions embodied therewith, the program instructions executable by a computing device to cause the computing device to perform a method comprising:
   determining, at a navigation system comprising a central processing unit, a global positioning system receiver and a display, a road sinuosity of the route from a starting point provided by the global positioning system receiver to a destination point based on digitized map data comprising:
   obtaining a digitized route which comprises data coordinates at a plurality of discrete data points along the route;

determining a distance between each data point from the data coordinates of each data point to result in a plurality of distances;

summing the distances between all of the data points:

determining the value of rotation angles between route segments;

calculating the road sinuosity S(R) by summing the absolute value of all of the rotation angles and dividing by the sum of the distances between all of the data points;

experimentally determining by the central processing unit a time multiplier by a tabulated function in which the time multiplier is determined for various road sinuosities;

obtaining by the central processing unit an estimated travel time of the route from the navigation system;

calculating by the central processing unit a corrected travel time by multiplying the estimated travel time by the time multiplier to result in a corrected travel time; and displaying on the display the corrected travel time to a viewer of the display.

6. The computer program product of claim 5 wherein determining the value of the rotation angles is according to the following equation:

$$\text{angle}(P_i) = \pi - \cos^{-1}\left(\frac{dist(P_{i-1}, P_i)^2 + dist(P_i, P_{i+1})^2 - dist(P_{i-1}, P_{i+1})^2}{2 \times dist(P_{i-1}, P_i) \times dist(P_i, P_{i+1})}\right)$$

where angle $(P_i)$=angle $\alpha_i$ at point $P_i$ (between segments $P_{i-1}$, $P_i$), and $(P_i, P_{i+1})$).

7. The computer program product of claim 6 wherein calculating the road sinuosity S(R) is according to the following equation:

$$S(R) = \frac{\sum_{i=2}^{n-1} |\text{angle}(P_i)|}{\sum_{i=1}^{n-1} dist(P_i, P_{i+1})}.$$

8. The computer program product of claim 5 further comprising downloading the digitized map data from a source having the digitized map data.

9. A navigation system comprising:

a central processing unit;

a global positioning system receiver locating the navigation system;

a nonvolatile storage for storing digitized map data;

road sinuosity of a route to be traveled by a user calculated from a starting point provided by the global positioning system receiver to a destination point comprising:

a digitized route for the route to be traveled by the user obtained from the stored digitized map data, the digitized route comprising data coordinates at a plurality of discrete data points along the route;

a distance between each data point determined from the data coordinates of each data point to result in a plurality of distances;

the distances between all of the data points summed:

a value of rotation angles between route segments;

road sinuosity S(R) calculated by summing the absolute value of all of the rotation angles and dividing by the sum of the distances between all of the data points the central processing unit programmed to determine an estimated travel time of the route;

the central processing unit programmed to determine a corrected travel time using the road sinuosity S(R); and a display that displays the corrected travel time to a viewer of the display.

10. The navigation system of claim 9 wherein the central processing unit programmed to determine a corrected travel time comprises:

a time multiplier for each road sinuosity determined by a tabulated function in which the time multiplier is determined for various road sinuosities, the time multiplier being stored in the nonvolatile storage; and the corrected travel time calculated by the time multiplier for the road sinuosity retrieved from the nonvolatile storage multiplied by the estimated travel time to result in a corrected travel time.

11. The navigation system of claim 9 wherein the value of the rotation angles is determined according to the following equation:

$$\text{angle}(P_i) = \pi - \cos^{-1}\left(\frac{dist(P_{i-1}, P_i)^2 + dist(P_i, P_{i+1})^2 - dist(P_{i-1}, P_{i+1})^2}{2 \times dist(P_{i-1}, P_i) \times dist(P_i, P_{i+1})}\right)$$

where angle $(P_i)$=angle $\alpha_i$ at point $P_i$ (between segments $P_{i-1}$, $P_i$), and $(P_i, P_{i+1})$).

12. The navigation system of claim 11 wherein the road sinuosity S(R) is calculated according to the following equation:

$$S(R) = \frac{\sum_{i=2}^{n-1} |\text{angle}(P_i)|}{\sum_{i=1}^{n-1} dist(P_i, P_{i+1})}.$$

13. The navigation system of claim 9 further comprising a communication capability.

14. The navigation system of claim 13 further comprising to download the digitized map data by the communication capability from a source having the digitized map data.

15. The navigation system of claim 13 further comprising the central processing unit programming the road sinuosity in cooperation with the communication capability to download the digitized map data from a source having the digitized map data.

16. The navigation system of claim 13 further comprising the central processing unit programming the corrected travel time in cooperation with the communication capability to download the digitized map data from a source having the digitized map data.

* * * * *